UNITED STATES PATENT OFFICE.

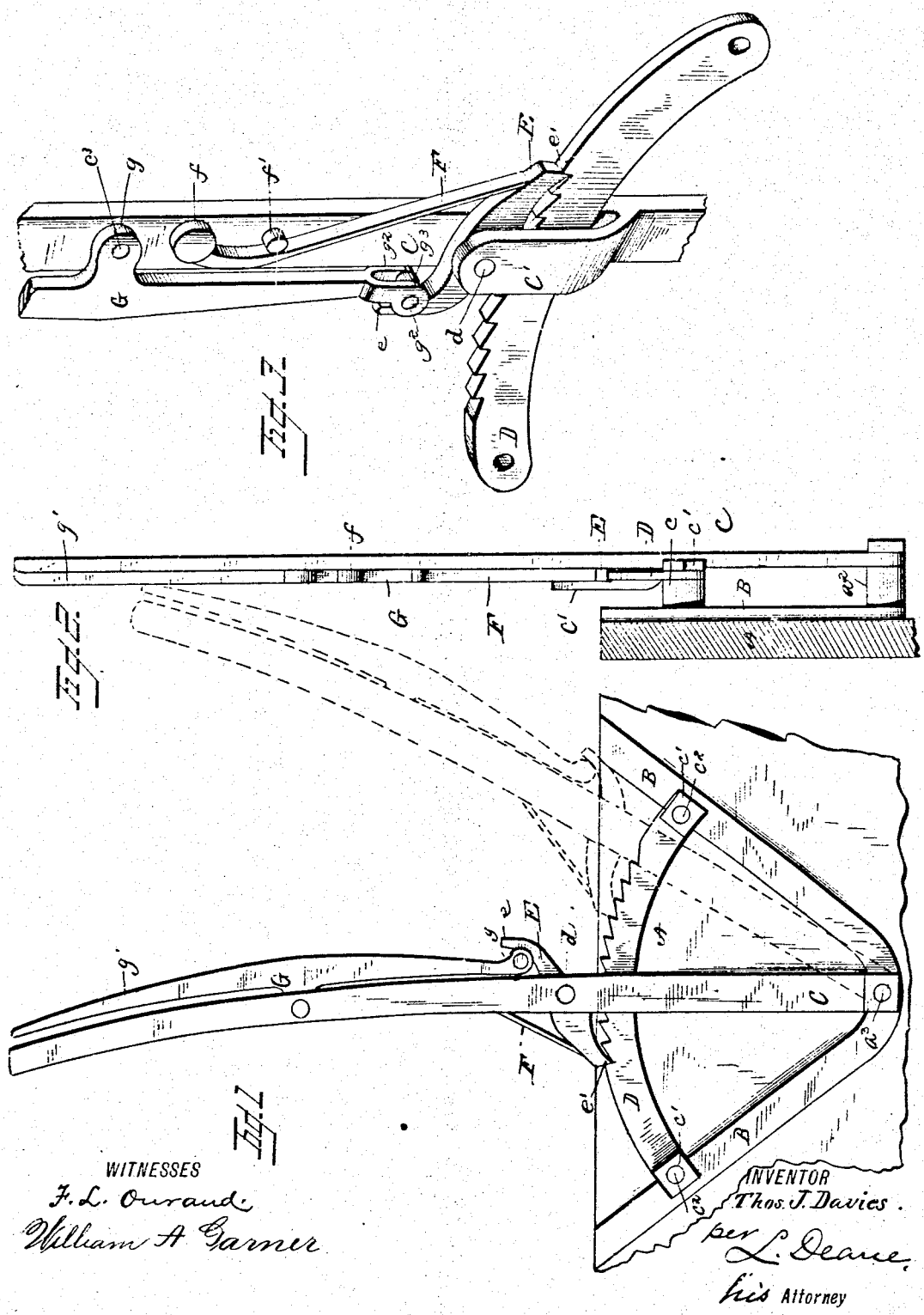

THOMAS J. DAVIES, OF NEWARK, OHIO, ASSIGNOR OF ONE-HALF TO DANIEL THOMAS, OF SAME PLACE.

WAGON-BRAKE LEVER.

SPECIFICATION forming part of Letters Patent No. 296,143, dated April 1, 1884.

Application filed January 21, 1884. (No model.)

*To all whom it may concern:*

Be it known that I, THOMAS J. DAVIES, a citizen of the United States, residing at Newark, in the county of Licking and State of Ohio, have invented certain new and useful Improvements in Wagon-Brakes, of which the following is a specification, reference being had therein to the accompanying drawings.

Figure 1 is a side elevation of my improved wagon-brake, showing the pawl in two positions by the aid of dotted lines. Fig. 2 is an edge view of Fig. 1. Fig. 3 is a detail indicating the pawl and its spring and the auxiliary hand-lever.

The object of this invention is to improve means for actuating hand-brakes for wagons; and it consists, essentially, in means whereby the brake-lever is positively held in its place on a toothed arc by means of an independent lever actuated, in part, by a spring, and having an anti-friction roller on its lower arm or end which will bear against the tail of the pawl.

I am aware it is not broadly new to use an auxiliary lever in combination with a primary lever and a pawl and ratchet, and therefore I make no broad claim to these devices.

The gist of my invention will appear from the following description, when taken in connection with the annexed drawings.

Let A designate one side of a wagon-body. To this side (outside) of the body I rigidly secure a V-shaped strap-iron, B. This iron not only affords rigidity to the side of the wagon-body, but it also affords a strong basis for the attachment of my improved brake-lever, which I shall now describe.

At the lower angle of the V-shaped strap-iron B, I rigidly affix or form a fulcrum-pin or collar, $a^2$, which is adapted to serve, in connection with a bolt, $a^3$, and a nut, as the fulcrum of lever C. This lever is connected by means of a rod with the brakes of the rear wheels in the usual well-known manner. The upper arm of the lever C is adapted to afford a handle for the driver sitting in his seat on the wagon. At the upper ends of the V-shaped brace B, I rigidly secure a toothed segment, D, by means of tubes $c c$, nuts $c' c'$, and bolts $c^2 c^2$, the heads of the bolts $c^2 c^2$ being in close contiguity with the wagon-body. It is thus obvious that the rack or toothed segment D serves a twofold purpose in combination with the V-shaped strap—to wit, as a rigid brace and a bearing for the levers. Let it be observed that at the angle of the strap-iron I have a tube formed on this iron which is an integral part thereof, and which affords a bearing for the fulcrum-pin of the brake-lever. Now, having established my fulcrum, I pivot to the hand-lever at $d$ a pawl, E. This pawl is peculiar in this respect, that it has an upturned angular tail, $e$, and a gripping portion, $e'$. Its fulcrum is at $d$, on a pin which has its rigid bearing on the hand-lever C and the offset C' thereof. This offset C', and also the bifurcated end of the lower arm of an auxiliary or tripping-lever, G, resists lateral strain on the pawl E, and therefore I consider this combination a very important feature of my invention. The pawl E is adapted to engage with the teeth of the segment D, and to hold the lever C at any desired angle or point of adjustment.

For the purpose of positively holding the pawl E in engagement with the teeth of the rack-segment, I employ a spring, F, which is secured to the said hand-lever at $f$ and strained by a pin, $f'$, also fixed to this lever. It will be observed that the spring is so adapted and applied above the pawl E as to press downwardly upon it, and thus, as it is a straight spring, the thrust is so effectually exerted upon the end of the pawl as to hold down under all ordinary conditions.

Above the point $f$ of attachment of the spring F to the hand-lever C, I fix to this lever a stud, $c^3$, which affords a fulcrum for an offset, $g$, of an auxiliary tripping-lever, G. This auxiliary lever is constructed almost symmetrically within the main or hand lever C. Its upper spread end, $g'$, lies in such close relation to the said main lever that the handles of the two levers can be grasped at the same time by the driver on his seat. The lower arm of this auxiliary lever G is bifurcated, as shown at $g^2 g^2$, and the bifurcations are enlarged to straddle the aforesaid upturned end or tail of the pawl E. Between the bifurcations $g^2 g^2$ is an anti-friction wheel or roll, $g^3$, which is adapted to press against the said tail of the pawl when it is desired to disengage its gripping end from the sector or toothed rack. It will be seen that the pawl is not connected to the auxiliary lever, although by a simple manipulation of this lever the pawl can be disengaged from its rack.

From what has been stated it will be seen that the pawl and the auxiliary lever are disconnected. Consequently the pawl is held positively in engagement with the rack, and the brakes cannot be casually released, when they are set, by any jarring or concussions incident to descending a rough and rugged hill; and while these advantages obtain it will also be observed that at any time by a simple grasp of the two levers the auxiliary or supplemental lever can be brought into action and the brakes released or adjusted, as may be desired.

Having described my invention, what I claim as new is—

1. The combination, in a wagon-brake, of a hand-lever, a toothed sector, a spring-actuated pawl, which is pivoted to the said hand-lever, and an auxiliary lever also pivoted to said hand-lever, and having an anti-friction roller on its lower end adapted to bear against the upturned end of the pawl, all constructed and adapted to operate substantially as described.

2. The V-shaped wagon-body brace having formed on its acute-angular portion a stud, the hand-lever fulcrumed on this stud, as described, the toothed sector serving as a tie between the arms of the brace, the main hand-lever, the spring-actuated pawl, and the independent pawl-tripping lever, substantially as described.

3. In combination with a toothed sector, secured rigidly to a wagon-body, a hand-lever connected to the brakes, the spring-actuated pawl having an upturned extension or tail, and an auxiliary lever having at its lower bifurcated end an anti-friction roll adapted to trip the said pawl and release the brake, substantially as described.

In testimony whereof I affix my signature in presence of two witnesses.

THOMAS J. DAVIES.

Witnesses:
JONATHAN REES,
A. SWARTZ.